United States Patent Office 3,055,213
Patented Sept. 25, 1962

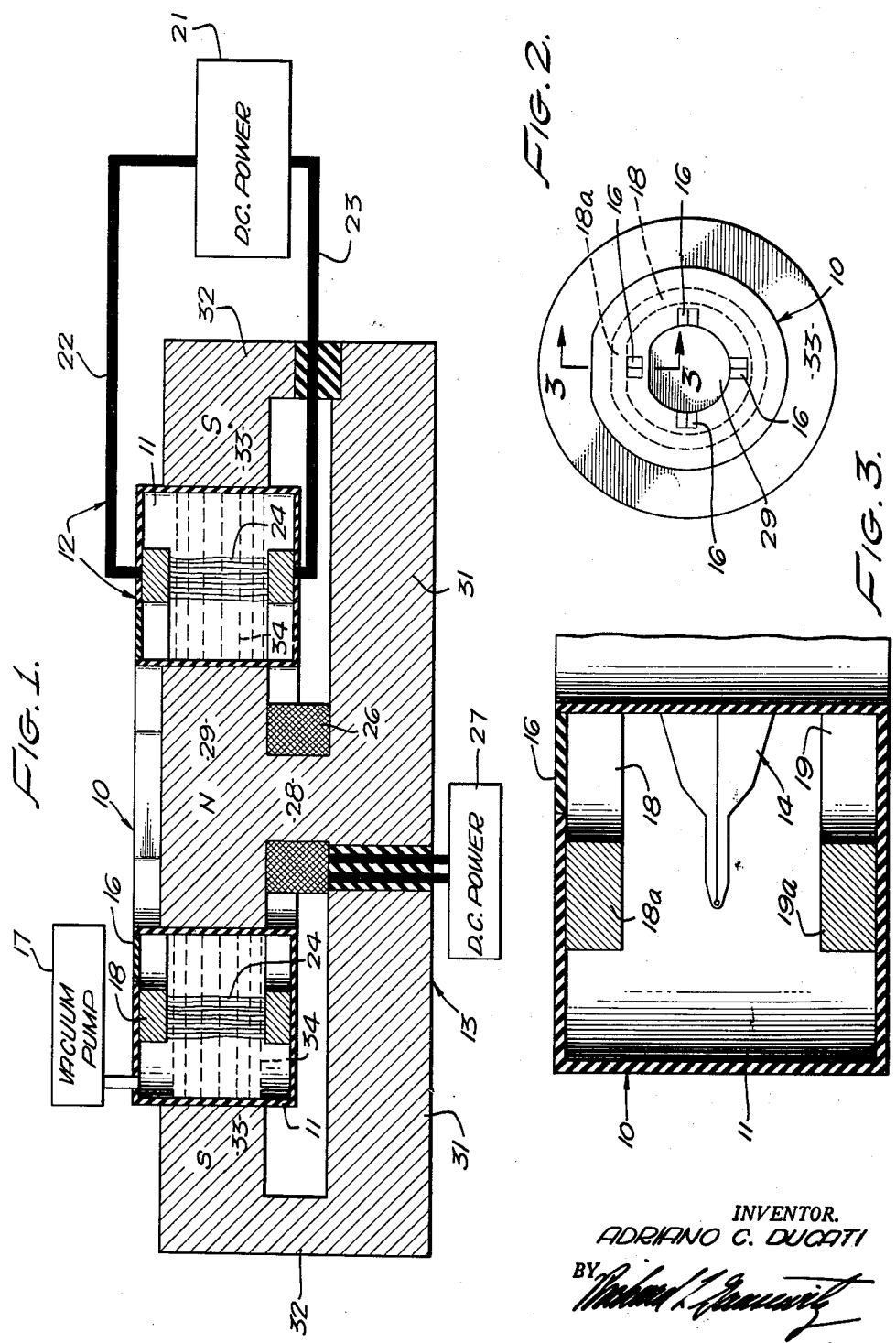

3,055,213
WIND TUNNEL APPARATUS MAKING USE OF THE MOMENTUM OF ELECTRICAL PLASMA
Adriano C. Ducati, Corona Del Mar, Calif., assignor to Plasmadyne Corporation, Santa Ana, Calif., a corporation of California
Filed Feb. 24, 1959, Ser. No. 794,970
1 Claim. (Cl. 73—147)

This invention relates to a plasma momentum apparatus, and more particularly to a wind tunnel apparatus for determining the aerodynamic characteristics of various test objects.

Conventional wind tunnel apparatus is characterized by the presence of a number of defects or limitations, some of which will now be briefly referred to. The first such limitation is that, where it is desired to achieve high Mach numbers, gas is introduced into a chamber which has been evacuated to a high degree. Thus, it is common practice to provide a large chamber and to evacuate it by running a vacuum pump for hours. After a high degree of vacuum has been obtained, the test is made by introducing gas into the evacuated chamber in such manner that it will flow at high velocity past the test object. However, such introduction of gas has the necessary effect of destroying the vacuum within a period of a few seconds. Thus, the test is necessarily of brief duration and cannot be repeated, without an excessive delay, unless the evacuation apparatus is very large in capacity and thus costs a great amount to purchase and operate.

Other defects or limitations of conventional wind tunnel apparatus relate to the necessity of heating the gas in order to prevent excessive cooling of the test object, and to the necessity of mounting the test object at only one critical region in the evacuated chamber. With relation to the latter, it is pointed out that it is common practice to provide a large tunnel and to test only one or very few objects therein during a given test run, it being unsatisfactory to mount test objects at various spaced positions in the tunnel.

In view of the above factors characteristic of conventional wind tunnel apparatus, and methods of operating the same, it is an object of the present invention to provide a wind tunnel apparatus wherein the performance of a test does not have the effect of reducing the degree of vacuum in the test chamber.

A further object is to provide a wind tunnel apparatus making use of the momentum of electrical plasma, and having the effect of maintaining the temperature of the gas and the test object at a relatively high level.

A further object of the invention is to provide a wind tunnel apparatus wherein a substantial number of test objects may be mounted at a number of longitudinal positions in the tunnel, thereby permitting the testing of many objects at the same time.

These and other objects and advantages of the invention will be set forth more fully in the following specification and claim, considered in connection with the attached drawing to which they relate.

In the drawing:
FIGURE 1 is a schematic sectional view taken diametrically of a wind tunnel apparatus embodying the present invention;
FIGURE 2 is a reduced top plan view of the wind tunnel apparatus; and
FIGURE 3 is a fragmentary section taken generally on line 3—3 of FIGURE 2, but omitting a representation of the means for generating the magnetic field.

Stated generally, the apparatus comprises wall means 10 to define a generally annular chamber 11 adapted to contain one or more test objects, means 12 to generate one or more electrical arcs or discharges in such chamber transversely to the axis thereof, and magnetic means 13 to effect high-velocity movement of the arc or discharge longitudinally of the axis of the chamber 11 to thereby create the desired wind effect. Suitable means, schematically represented at 14 in FIGURE 3, are provided in chamber 11 to effect mounting of each test object (not shown) at such position that it will be contacted by the moving arc or discharge, which may also be referred to as plasma. Door means 16 are provided in the wall means 10, adjacent each of the mounting means 14, in order to permit access to the chamber 11 for mounting and removal of the test objects. The door means 16 are provided with seals, not shown, to block entrance of air into chamber 11 and thereby maintain the substantial vacuum created therein by means of a suitable vacuum pump, schematically indicated at 17 in FIGURE 1. It is to be understood that suitable windows, not shown, may be formed in the wall means to permit observation of the phenomena occurring in the vicinity of the test object or objects.

Stated more definitely, the wall means 10 are illustrated as comprising a hollow ring or annulus having a generally rectangular cross-sectional shape. The wall means may be many feet in diameter and may be formed of a suitable electrically non-conductive substance, or else provided with suitable insulation to prevent shorting of current between the electrode portions of the electrical discharge means 12. As previously indicated, the wall means is constructed with access doors 16 and with one or more mounting brackets 14 adapted to support the test object between the electrodes. Such mounting means 14 should be so shaped as to provide a minimum of resistance to the "wind" created upon movement of the discharge as will be described subsequently. The wall means is sufficiently strong to prevent collapse when the chamber 11 defined therein is evacuated by means of the pump 17.

The electrical discharge means 12 is illustrated to comprise upper and lower annular electrodes or rails 18 and 19, respectively. Electrodes 18 and 19 are shown as being mounted on the upper and lower interior surfaces of the wall means 10, the electrodes having diameters generally intermediate the diameters of the generally cylindrical concentric portions of the wall means. The electrodes are spaced apart a distance sufficient to permit mounting of a test object therebetween, as by the mounting means 14, but not so far apart as to render it impractical to effect an electrical discharge therebetween.

The means 12 further comprises a source 21 of D.C. power, such source being connected through suitable leads or buss bars 22 and 23 to the electrodes 18 and 19. It is to be understood that the source 21 is adapted to supply a large direct current to the electrodes at one or more points therealong in order to maintain an electrical discharge, represented schematically at 24, between the electrodes and transversely to the axis of the chamber 11. The current supply means 12 may be adapted to effect generation of discharges simultaneously at various (or all) portions of the opposed electrodes.

As employed in the present specification and claim, the term "axis of chamber 11," and similar terms, denote the generally circular axis which is parallel with and disposed between the electrodes 18 and 19, having much the same diameter. Such phrase does not have reference to the axis of the entire apparatus, about which the wall means 10, the electrodes, etc., are generally concentric.

One or more portions of the electrodes 18 and 19, and of the wall means 10, may be made straight (instead of arcuate) as indicated at the upper portion of FIGURE 2. Thus, the electrode portions 18a and 19a (FIGURES 2 and 3) are illustrated as being straight in order that the electrical discharge moving therealong will travel in a straight line when it passes the test object mounted on the associated bracket or support means 14.

The means 13, for generating the magnetic field adapted to move the discharge 24 along the electrodes or tracks 18 and 19, is illustrated schematically to comprise a solenoid 26 supplied with a large direct current from a suitable source 27. Solenoid 26 is mounted around the center leg 28 of a large core formed of magnetizable material such as soft iron. The leg 28 connects at its upper end to one of the poles of the magnet, indicated as the north pole 29, such pole being generally disc-shaped and extending radially into close proximity with the inner cylindrical portion of the wall means 10. At its lower end, the center leg 28 connects with a large disc-shaped base 31 having an upwardly-extending flange 32 at its peripheral portion. Flange 32 is provided with a radially-inwardly extending pole portion which is indicated as the south pole 33. The flange 32 and the pole portion 33 are annular in shape, and the inner surface of the pole 33 is disposed closely adjacent the outer cylindrical portion of the wall means 10. It follows that upon application of the source 27, a radially-directed continuous magnetic field will be generated in chamber 11 between the north and south poles 29 and 33, such field being represented by the flux lines 34. It is pointed out that the flux lines are perpendicular to the discharge 24 and to the axis of the annular chamber 11.

The means 13 for generating the magnetic field is only schematically represented, it being understood that a large number of coils, cores, etc., may be employed in order to generate a very strong magnetic field in the discharge chamber. The field must be sufficiently strong to effect very high-velocity movement of the discharge 24 along the electrodes or tracks 18 and 19 and longitudinally of the arc chamber 11. Such movement of the discharge results from a force, known as the Lorentz force, resulting from the interaction between the magnetic field and the electrical discharge. It is pointed out that the discharge moves in a direction transverse to the direction of space current flow between the electrodes.

*Summary of the Method*

Stated generally, the method comprises providing a sealed chamber, reducing the pressure of the gas in such chamber to a small fraction of atmospheric pressure, generating an electric discharge or arc in the chamber, and subjecting the arc or discharge to the action of a magnetic field adapted to move the same at high velocity into engagement with an object to be tested.

Stated more definitely, and with particular reference to the apparatus illustrated in the drawing, the method comprises opening one or more access doors 16 in wall means 10 and introducing one or more test objects into chamber 11. The test objects are mounted on brackets, one of which is schematically represented at 14 in FIGURE 3, so as to be disposed directly between the electrodes or tracks 18 and 19 in order that the test objects will be engaged by the moving plasma. After the test objects are properly mounted at one or more positions in the annular chamber 11, the access doors 16 are shut and sealed against entrance of air. Vacuum pump 17 is then operated for a period of time sufficient to reduce the pressure in the chamber 11, for example to 10 mm. of mercury or lower. Small amounts of a readily ionized gas, such as argon, may be employed in the chamber 11 instead of air, although it is normally desired to use air since this provides the most pertinent information relative to the aerodynamic behavior of a test object in the atmosphere. After the evacuation operation is completed, the vacuum pump 17 may be turned off since no additional gas need be introduced into the chamber 11 in order to generate the wind therein.

The D.C. power source 21 is then applied in order to effect initiation of the discharge 24 between electrodes 18 and 19. The initiation of the discharge may be aided by conventional high-frequency means, or by other means known to the art. The current applied from source 21 may be large, such as hundreds or thousands or even millions, of amperes.

The second power source 27 is then applied in order to generate the magnetic field, indicated by flux lines 34, in chamber 11 and directed transversely of the axis of such chamber and also transversely of the electrical discharge 24. The magnetic field is sufficiently strong to effect high-velocity movement of the discharge 24 along tracks 18—19 so that the discharge (or discharges) whirls around the chamber to produce a strong wind effect. This plasma "wind" engages the test object at high velocity to produce aerodynamic effects which may be observed and recorded by methods known to the art with relation to conventional wind tunnels. As previously stated, the test object may be mounted on a straight portion 18a—19a of the track means in order that the wind will be moving in a straight line when moving past the test object.

The test may be continued for any desired length of time, since the performance of the test does not effect reduction of the vacuum. There being no expansion of gas from a pressure source into an evacuated space, no undesirable cooling effects are produced, the chamber 11 instead being maintained relatively warm by the electrical discharge. Suitable cooling means for the wall means 10, electrodes 18 and 19, etc., may be provided.

The test object (or objects) may then be removed and replaced by another, after which the chamber 11 may again be evacuated and a second test performed. Such evacuation is not as time-consuming as the evacuation of many types of wind tunnels, since the volume of the present tunnel may be relatively small and the degree of evacuation relatively low.

Various embodiments of the present invention, in addition to what has been illustrated and described in detail, may be employed without departing from the scope of the accompanying claim.

I claim:

A wind tunnel apparatus, comprising wall means to define a generally annular chamber, means to support at least one test object in said chamber, door means to afford access to said chamber to permit mounting of a test object on said support means and removal of said test object therefrom upon conclusion of the test, means to effect substantial evacuation of said chamber, first and second large-diameter generally annular electrodes mounted in said chamber in spaced parallel relationship and on opposite sides of the position to be occupied by said test object, said electrodes having straight portions adjacent at least one support means for a test object, means to supply large direct current to said electrodes to thereby create a direct electrical discharge therebetween in said chamber, and electromagnetic means to generate a strong direct magnetic field in said chamber transversely to said discharge and transversely to said electrodes, said last-named means being adapted to generate said magnetic field throughout the entire circumference of said chamber and with sufficient strength to effect high-velocity movement of said discharge around said chamber.

References Cited in the file of this patent

UNITED STATES PATENTS

| 2,819,423 | Clark | Jan. 7, 1958 |
| 2,826,708 | Foster | Mar. 11, 1958 |
| 2,992,345 | Hansen | July 11, 1961 |

OTHER REFERENCES

Publication: Physical Review, vol. 79, July 1, 1950, page 186, article by Early et al. (Copy in 73–147.)

Publication: Machine Design, article by Reid, "The Plasma Jet," February 1958, pages 22–24. (Copy in 73–147.)

Publication: Magnetohydrodynamics, Stanford University Press (1957), article by Kolb, pages 76, 77. (Copy in Scientific Library.) QC 809 M3L3.